(12) United States Patent
Abernathy et al.

(10) Patent No.: US 8,099,582 B2
(45) Date of Patent: Jan. 17, 2012

(54) TRACKING DEALLOCATED LOAD INSTRUCTIONS USING A DEPENDENCE MATRIX

(75) Inventors: Christopher M. Abernathy, Austin, TX (US); Mary D. Brown, Austin, TX (US); William E. Burky, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/410,024

(22) Filed: Mar. 24, 2009

(65) Prior Publication Data

US 2010/0250902 A1    Sep. 30, 2010

(51) Int. Cl.
G06F 9/312    (2006.01)
G06F 9/38    (2006.01)

(52) U.S. Cl. ......................... 712/216; 712/219

(58) Field of Classification Search .................. 712/216, 712/219
See application file for complete search history.

(56) References Cited

U.S. PATENT DOCUMENTS

| | | | |
|---|---|---|---|
| 6,334,182 B2 | 12/2001 | Merchant et al. | |
| 6,557,095 B1 | 4/2003 | Henstrom | |
| 6,651,161 B1 * | 11/2003 | Keller et al. | 712/216 |
| 6,883,086 B2 * | 4/2005 | Dundas | 712/205 |
| 6,988,183 B1 | 1/2006 | Wong | |
| 7,055,021 B2 | 5/2006 | Kadambi | |
| 7,373,482 B1 * | 5/2008 | Spracklen et al. | 712/207 |
| 2003/0182536 A1 * | 9/2003 | Teruyama | 712/214 |
| 2004/0226011 A1 | 11/2004 | Augsburg et al. | |
| 2005/0149698 A1 | 7/2005 | Yeh et al. | |
| 2005/0216900 A1 | 9/2005 | Shi et al. | |
| 2007/0180221 A1 | 8/2007 | Abernathy et al. | |

OTHER PUBLICATIONS

Brown, Mary D. et al., "Select-Free Instruction Scheduling Logic", *Proceedings of the 34th ACM/IEEE International Symposium on Microarchitecture*, Austin, Texas, Dec. 2001, pp. 204-213.
Goshima, Masahiro et al., "A High-Speed Dynamic Instruction Scheduling Scheme for Superscalar Processors", *Proceedings of the 34th Annual ACM/IEEE International Symposium on Microarchitecture*, Austin, Texas, Dec. 2001, pp. 225-236.
Patt, N. Y. et al., "Critical Issues Regarding HPS, a High performance Microarchitecture", Proceedings of the 18th Annual ACM/IEEE International Symposium on Microarchitecture, 1985, pp. 109-116.
U.S. Appl. No. 12/236,175, filed Sep. 23, 2008, Abernathy, Christopher M., et al.
International Search Report and Written Opinion dated Jul. 6, 2010 for International Application No. PCT/EP2010/053371, 10 pages.

* cited by examiner

*Primary Examiner* — Daniel Pan
(74) *Attorney, Agent, or Firm* — Francis Lammes; Stephen J. Walder, Jr.; Diana R. Gerhardt

(57) ABSTRACT

A mechanism is provided for tracking deallocated load instructions. A processor detects whether a load instruction in a set of instructions in an issue queue has missed. Responsive to a miss of the load instruction, an instruction scheduler allocates the load instruction to a load miss queue and deallocates the load instruction from the issue queue. The instruction scheduler determines whether there is a dependence entry for the load instruction in an issue queue portion of a dependence matrix. Responsive to the existence of the dependence entry for the load instruction in the issue queue portion of the dependence matrix, the instruction scheduler reads data from the dependence entry of the issue queue portion of the dependence matrix that specifies a set of dependent instructions that are dependent on the load instruction and writes the data into a new entry in a load miss queue portion of the dependence matrix.

20 Claims, 5 Drawing Sheets

TRACKING DEALLOCATED LOAD INSTRUCTIONS USING A DEPENDENCE MATRIX

BACKGROUND

The present application relates generally to an improved data processing apparatus and method and more specifically to an apparatus and method for tracking deallocated load instructions using a dependence matrix.

A microprocessor is the heart of a modern computer, a chip made up of millions of transistors and other elements organized into specific functional operating units, including arithmetic units, cache memory and memory management, predictive logic, and data movement. Processors in modern computers have grown tremendously in performance, capabilities, and complexity over the past decade. Any computer program consists of many instructions for operating on data. Processors may be categorized as in-order processors or out-of-order processors.

In modern high-performance processors, instructions may be scheduled for execution out-of-order. Instructions may be scheduled for execution after their source operands are available. Known dynamic instruction schedulers may use dependence matrices (also called wakeup arrays) to track source operands. Dependence matrices were originally introduced for use in processors as a way to track memory dependences among loads and stores and have been used for tracking register dependences in issue queues.

In some implementations, it may be desirable to deallocate instructions from the issue queue as quickly as possible after they have issued to make room for new instructions. However, known dependence matrices only track the availability of a producer if the instruction associated with the producer is still located within the issue queue. Hence instructions may not be deallocated from the queue if consumer instructions are still tracking availability of their results.

SUMMARY

In one illustrative embodiment, a method, in a data processing system, is provided for tracking deallocated load instructions. The illustrative embodiment detects whether a load instruction in a set of instructions in an issue queue has missed. The illustrative embodiment allocates the load instruction to a load miss queue in response to a miss of the load instruction. The illustrative embodiment then deallocates the load instruction from the issue queue. The illustrative embodiment determines whether there is a dependence entry for the load instruction in an issue queue portion of a dependence matrix. The illustrative embodiment reads data from the dependence entry of the issue queue portion of the dependence matrix that specifies a set of dependent instructions that are dependent on the load instruction in response to the existence of the dependence entry for the load instruction in the issue queue portion of the dependence matrix. The illustrative embodiment writes the data into a new entry in a load miss queue portion of the dependence matrix associated with the load miss queue.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
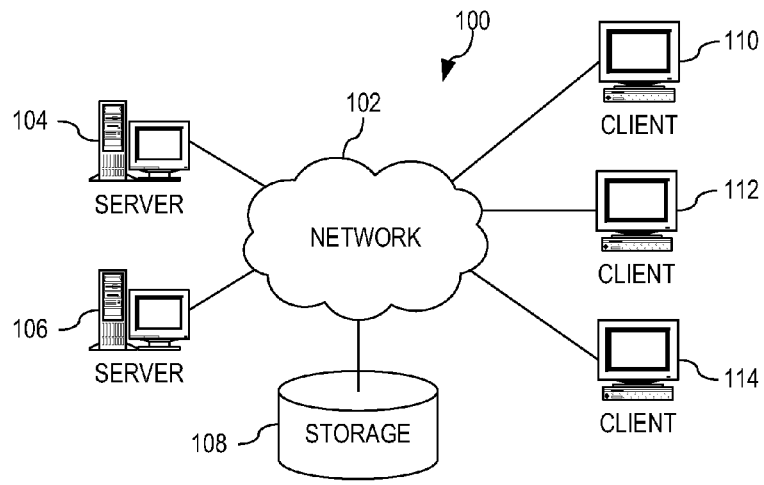
FIG. 1 depicts a pictorial representation of an example distributed data processing system in which aspects of the illustrative embodiments may be implemented.

The illustrative embodiments provide a mechanism to allow dependents of a load instruction to track the availability of the load's result both before and after the load is deallocated from the issue queue. The illustrative embodiments provide a dependence matrix that, instead of being N rows and N columns, is extended by L additional columns, where L is the number of entries in a load miss queue. When a load instruction is known to miss in the L1 cache and is allocated to the load miss queue, the load instruction's entry in the issue queue may be deallocated. When the load instruction is deallocated, the column of the matrix marking all dependents of the load instruction is read, and this column is written into the new column belonging to the load miss queue entry. Thus, the illustrative embodiments allow load instructions to be deallocated from the issue queue before their results are available, while still allowing dependent instructions to track the availability of their source operands using a dependence matrix. By deallocating load instructions before their results are available, new instructions are placed into the issue queue. The increase in queue utilization improves processor performance. Additionally, the illustrative embodiments allow an instruction's dependence information to be modified after it is placed in the issue queue, which was previously not possible with dependence matrices, i.e. the locations of an instruction's producers at any point in time may be the same or different than the resources tracked by the instruction when it was first placed into the issue queue.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
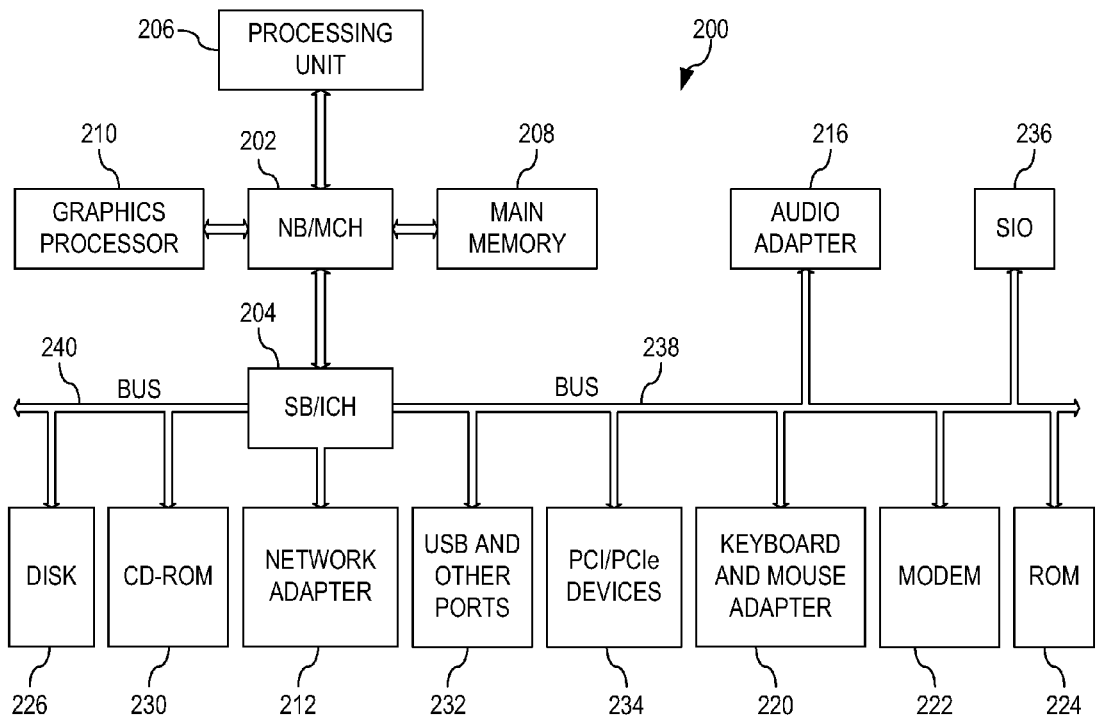
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for issuing instructions in-order in an out-of-order processor using false dependencies, this is only an example and is not intended to state or imply any limitation with regard to the features of the present invention. To the contrary, the illustrative embodiments are intended to include distributed data processing environments and embodiments in which instructions are issued instruction in-order in an out-of-order processor using false dependencies.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
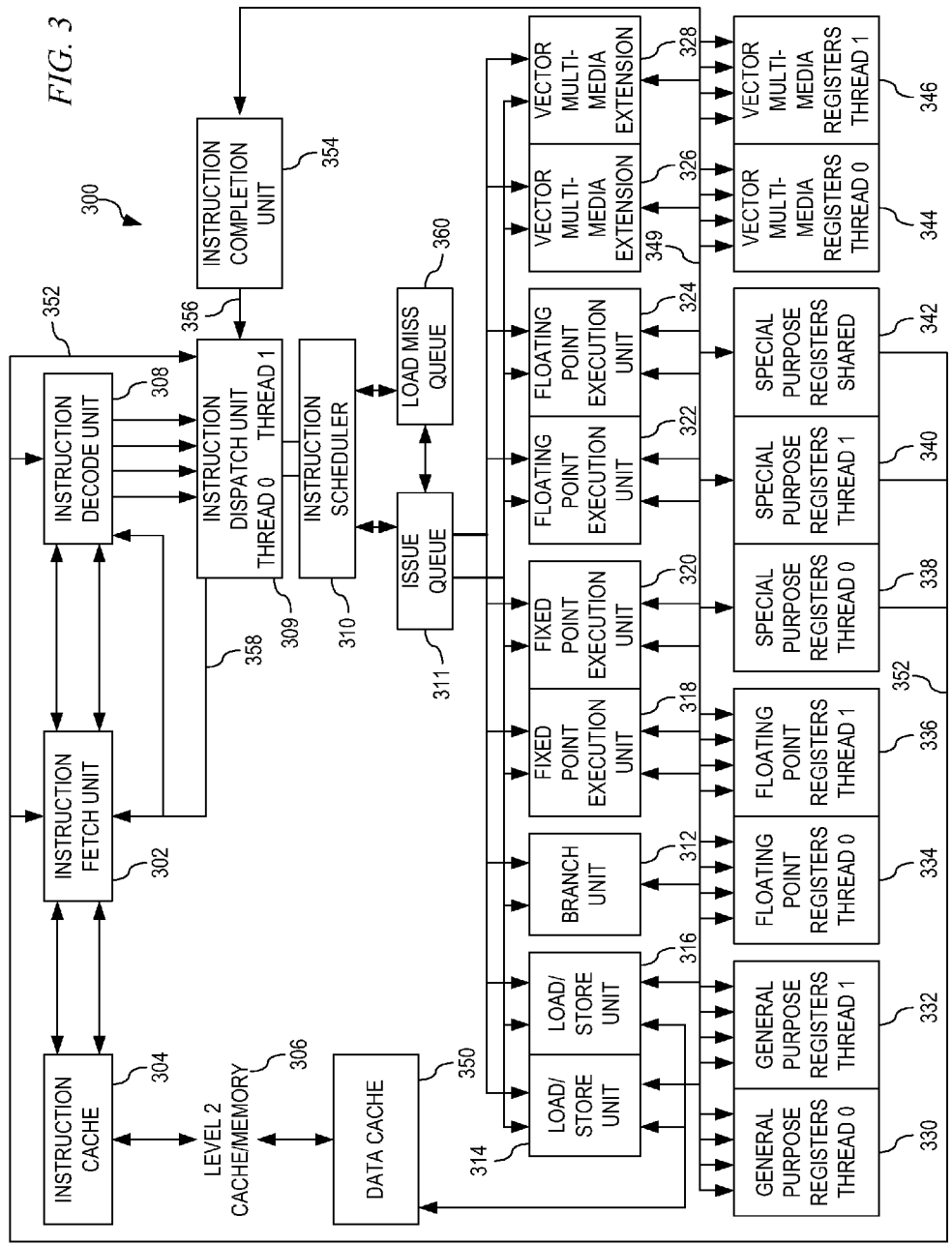
FIG. 3 depicts an exemplary block diagram of a conventional dual threaded processor design showing functional units and registers in accordance with an illustrative embodiment.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multi-threading (SMT) that may also be operated in a single threaded mode. Accordingly, as discussed further herein below, processor 300 includes various units, registers, buffers, memories, and other sections, all of which are formed by integrated circuitry. Also, in an illustrative embodiment, processor 300 operates according to reduced instruction set computer (RISC) techniques.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multi-threading (SMT) that may also be operated in a single threaded mode. Accordingly, as discussed further herein below, processor 300 includes various units, registers, buffers, memories, and other sections, all of which are formed by integrated circuitry. Also, in an illustrative embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 can request multiple instructions from instruction cache 304 for up to two threads at the same time. Instruction decode unit 308 decodes multiple instructions for up to two threads at the same time and passes decoded instructions to instruction dispatch unit (IDU) 309.

IDU 309 receives the decoded instructions from instruction decode unit 308 and may selectively group decoded instructions for each thread. IDU 309 outputs the instructions to instruction scheduler 310 that uses a dependence matrix to track source operands associated with the instructions. Once IDU 309 identifies the dependencies between the received instructions, instruction scheduler 310 issues the instructions to issue queue 311, which outputs or issues a group of instructions for each thread to execution units 312, 314, 316, 318, 320, 322, 324, 326, and 328 of the processor. When a load instruction misses in the L1 cache (not shown), instruction scheduler 310 allocates the load instruction to load miss queue 360 and deallocates the instruction from issue queue 311. A detailed description of the process performed by instruction scheduler 310 will be described in detail below.

In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file where completed data is stored once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to ARFs 330, 332, 334, 336, 338, 340, 342, 344, and 346 through simplified internal bus structure 349.

In order to execute a floating point instruction, FPUA 322 and FPUB 324 retrieve register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache.

In response to the instructions input from instruction cache 304 and decoded by instruction decode unit 308, IDU 309 selectively dispatches the instructions to execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

IDU 309 groups together instructions that are decoded by instruction decode unit 308 to be executed at the same time, depending on the mix of decoded instructions and available execution units 312, 314, 316, 318, 320, 322, 324, 326, and 328 to perform the required operation for each instruction. For example, because there are only two load/store units 314 and 316, a maximum of two load/store type instructions may be grouped together. In an illustrative embodiment, up to seven instructions may be grouped together (two fixed point arithmetic, two load/store, two floating point arithmetic or two vector multimedia extension, and one branch), and up to five instructions may belong to the same thread. IDU 309 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next allotment of processor time. Instruction scheduler 310 schedules threads in a round-robin fashion at each priority level, and only when there are no executable threads at a higher level does scheduling of threads at a lower level take place.

However, IDU 309 dispatches either FPU instructions 322 and 324 or VMX instructions 326 and 328 in the same group with FXU instructions 318 and 320. That is, IDU 309 does not dispatch FPU instructions 322 and 324 and VMX instructions 326 and 328 in the same group. Program states, such as an instruction pointer, stack pointer, or processor status word, stored in SPRs 338 and 340 indicate thread priority 352 to IDU 309.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and, as such, require a larger number of cycles to execute. Therefore, instructions that are grouped together and start executing at the same time do not necessarily finish executing at the same time. "Completion" of an instruction means that the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in the order they were dispatched and the completed data has to be updated as each instruction completes so that the next instruction used the most complete data.

Instruction completion unit 354 monitors for the completion of instructions, and sends control information 356 to IDU 309 to notify IDU 309 that more groups of instructions can be dispatched to execution units 312, 314, 316, 318, 320, 322, 324, 326, and 328. IDU 309 sends dispatch signal 358, which serves as a throttle to bring more instructions down the pipeline to IDU 309, to IFU 302 and instruction decode unit 308 to indicate that it is ready to receive more decoded instructions.

Figure 4:
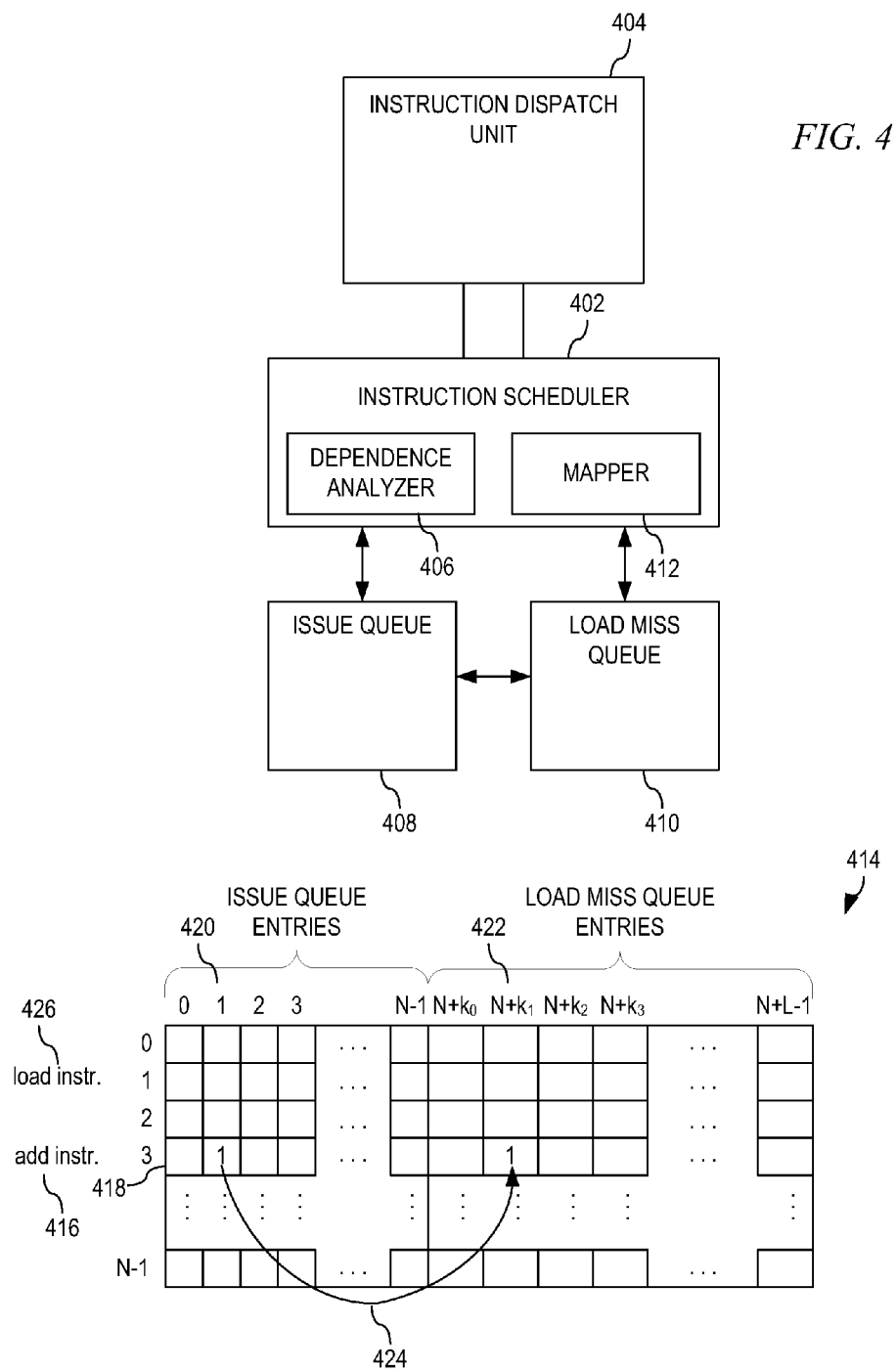
FIG. 4 depicts an exemplary block diagram of tracking deallocated load instructions with a dependence matrix in accordance with an illustrative embodiment.
Figure 5:
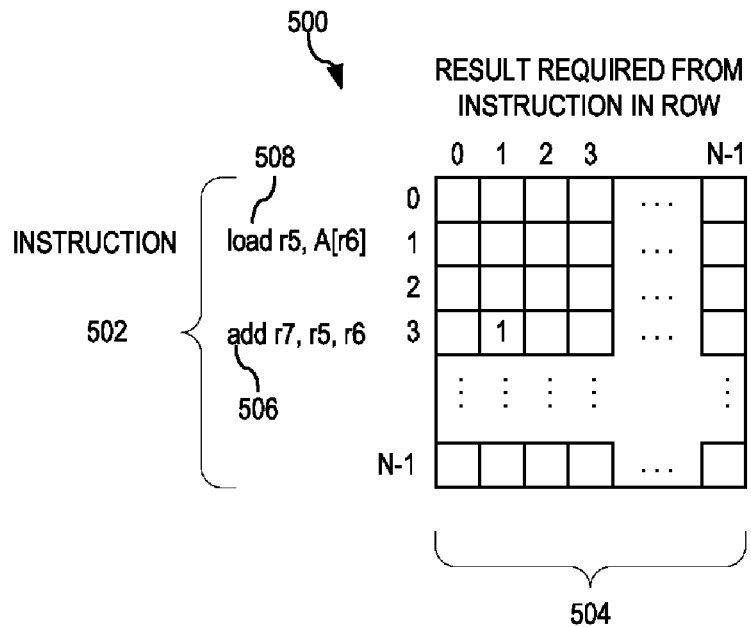
FIG. 5 depicts an exemplary basic dependence matrix in accordance with an illustrative embodiment.

FIG. 4 depicts an exemplary block diagram of tracking deallocated load instructions with a dependence matrix in accordance with an illustrative embodiment. Instruction scheduler 402 receives instructions from instruction dispatch unit 404 and uses dependence analyzer 406 to generate a dependence matrix to track source operands, i.e. data that will be used in the execution of the instruction. The dependence matrices tracks memory dependences among loads and stores and track register dependences from instructions in issue queue 408. FIG. 5 depicts an exemplary basic dependence matrix in accordance with an illustrative embodiment. In basic dependence matrix 500, there are N rows 502 and N columns 504, where N is the number of instructions in issue queue 408. There is one row for each instruction waiting in issue queue 408 to execute. For a given row and column, and instruction in a row depends on the availability of the result of the instruction in a column if the bit in the column and row, of the matrix, is a '1'. There may be additional columns to indicate dependences among other resources, such as execution units. For example, in FIG. 5, add instruction 506, in row 3, depends on the result of load 508 of register r5, in row 1. Therefore, instruction scheduler 402 updates the bit of column 1, which represents the load instruction, row 3, which represents the add instruction, to a '1'.

Returning to FIG. 4, again it is desirable to deallocate instructions from issue queue 408 as quickly as possible after the instructions have issued to make room for new instructions; however, one disadvantage with prior dependence matrices, such as basic dependence matrix 500 of FIG. 5, is that instructions only track the availability of their producers if the producers are still located within issue queue 408. Hence, instruction scheduler 402 may not deallocate instructions from issue queue 408 if consumer instructions, i.e. instructions that are dependent on the results of a previous instruction, are still tracking availability of their results.

The illustrative embodiment describes a way to allow dependents of a load instruction to track the availability of the load's result both before and after the load is deallocated from the issue queue. Thus, dependence analyzer 406 generates dependence matrix 414 that contains N rows and N+L columns, where N is the number of instructions in issue queue 408 and L is the number of instructions in load miss queue 410. If issue queue 408 issues a load instruction and the load instruction misses in the first-level (L1) data cache, load miss queue 410 allocates an entry for the load instruction. In dependence matrix 414, if instruction 416 in row 418 has a dependence, such as the dependency to instruction 426 indicated by the 1 in column 420 associated with the issue queue, then instruction scheduler 402 deallocates the dependence indicated in column 420 and allocates the dependence to column 422 associated with the load miss queue. That is, dependence scheduler 402 reads any entries in the columns that indicate dependencies associated with load instruction 420 and writes the dependencies into associated columns 422 associated with the load miss queue of dependence matrix 414. In this example, the entry indicted by arrow 424.

Figure 6:
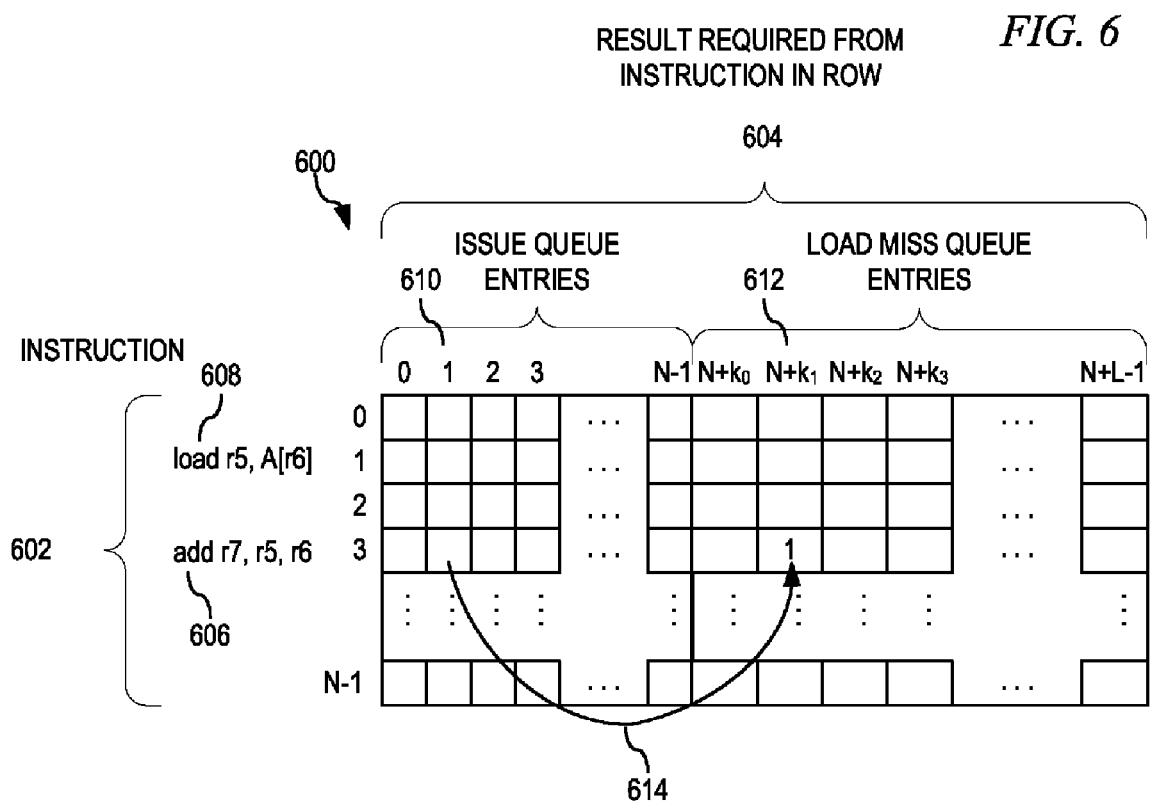
FIG. 6 depicts an exemplary extended dependence matrix in accordance with an illustrative embodiment.

FIG. 6 depicts an exemplary extended dependence matrix in accordance with an illustrative embodiment. The extended dependence matrix provides a way to allow dependents of a load instruction to track the availability of the load instruction's result while the instruction is allocated in the issue queue and after the load instruction has been deallocated from the issue queue and allocated to the load miss queue in the event of a load miss. In extended dependence matrix 600, there are N−1 rows 602 and N+L−1 columns 604 associated with issue queue 408 and load miss queue 410. Continuing with the example above, add instruction 606, in row 3, depends on the result of load 608 of register r5, in row 1. If issue queue 408 issues load instruction 608 and load instruction 608 misses in the first-level (L1) data cache, then instruction scheduler 402 deallocates the associated entry for load instruction 608 from column 610 and allocates the entry to column 612 in the extended dependence matrix 600 associated with the load miss queue. That is, instruction scheduler 402 reads the entry in column 610 in extended dependence matrix 600 with which the load instruction that has a dependence identified and writes the entry into column N+$k_1$ 612 of extended dependence matrix 600, indicated by arrow 614. Thus, in the illustrative embodiments an instruction's dependence upon a second instruction in the issue queue is converted to a dependence on the second instruction outside the issue queue.

Returning to FIG. 4, instruction scheduler 402 may also include mapper 412 that tracks the queue positions of all instructions waiting in issue queue 408. When instruction scheduler 402 first allocates instructions into issue queue 408, the instructions obtain the location of their source operands by reading mapper 412. When instruction scheduler 402 deallocates load instructions from issue queue 408 to allocate the load instructions to load miss queue 410, mapper 412 replaces the load instruction's issue queue entry with its load miss queue entry.

Figure 7:
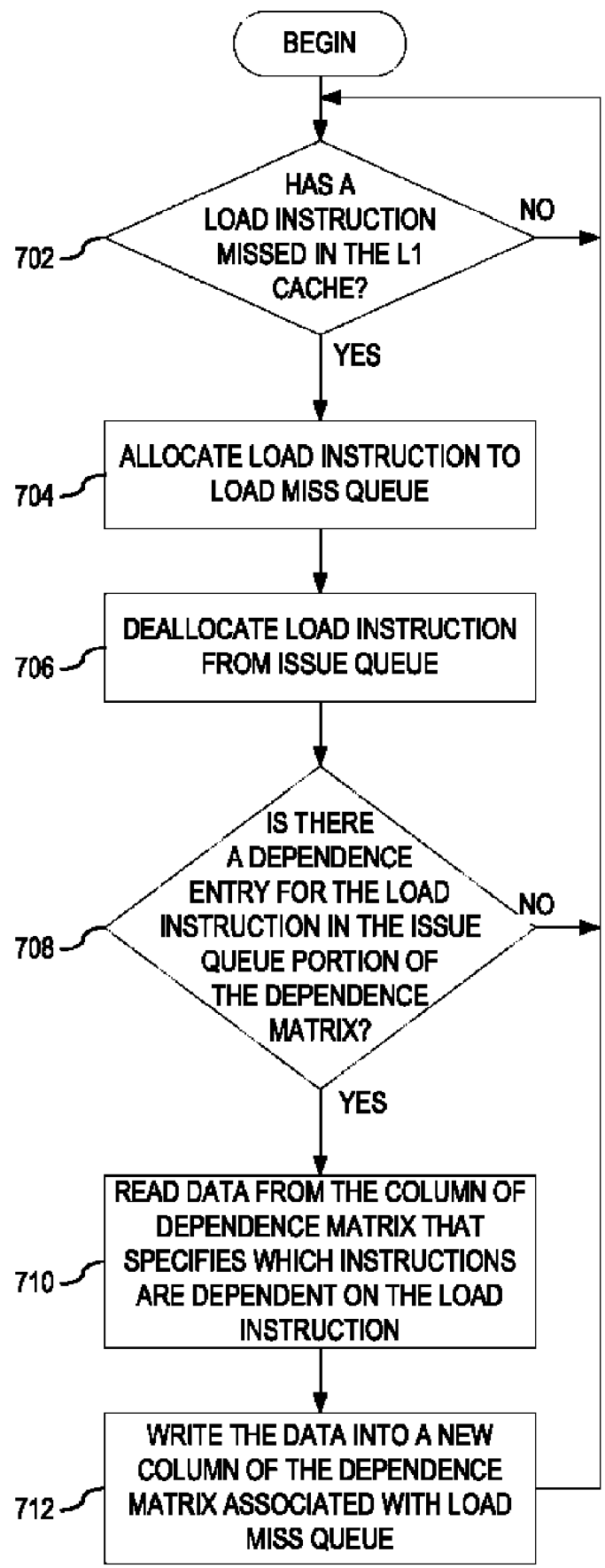
FIG. 7 depicts a flowchart for the operation performed in tracking deallocated load instructions with a dependence matrix in accordance with an illustrative embodiment.

FIG. 7 depicts a flowchart for the operation performed in tracking deallocated load instructions with a dependence matrix in accordance with an illustrative embodiment. As the operation begins, the processor detects that a load instruction has missed in the first layer (L1) cache (step 702). If at step 702 the processor fails to detect a miss, then the operation returns to step 702. If at step 702 the processor determines that the load instruction has missed in the L1 cache, then the instruction scheduler allocates the load instruction to the load miss queue (step 704). The instruction scheduler then deallocates the load instruction from the issue queue (step 706).

The instruction scheduler then determines if there is a dependence entry for the load instruction in the issue queue portion of the dependence matrix (step 708). If at step 708 the instruction scheduler determines there is no dependence entry for the load instruction in the issue queue portion of the dependence matrix, then the operation returns to step 702. If at step 708 the instruction scheduler determines that there is a dependence entry for the load instruction in the issue queue portion of the dependence matrix, then the instruction scheduler reads data from the columns associated with the load instruction of the dependence matrix that specifies which instructions are dependent on the load instruction (step 710). The instruction scheduler then writes the data into new columns associated with the load instruction of the dependence matrix associated with the load miss queue (step 712), with the operation returning to step 702 thereafter.

Thus, the illustrative embodiments provide a mechanism to allow dependents of a load instruction to track the availability of the load's result both before and after the load is deallocated from the issue queue. The illustrative embodiments provide a dependence matrix that, instead of being N rows and N columns, is extended by L additional columns, where L is the number of entries in a load miss queue. When a load instruction is known to miss in the L1 cache and is allocated to the load miss queue, the load instruction's entry in the issue queue may be deallocated. When the load instruction is deallocated, the column of the matrix marking all dependents of the load instruction is read, and this column is written into the new column belonging to the load miss queue entry.

The illustrative embodiments allow load instructions to be deallocated from the issue queue before their results are available, while still allowing dependent instructions to track the availability of their source operands using a dependence matrix. By deallocating load instructions before their results are available, new instructions are placed into the issue queue. The increase in queue utilization improves processor performance. Additionally, the illustrative embodiments allow an instruction's dependence information to be modified after it is placed in the issue queue, which was previously not possible with dependence matrices, i.e. the locations of an instruction's producers at any point in time may be the same or different than the resources tracked by the instruction when it was first placed into the issue queue.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for tracking deallocated load instructions, the method comprising:
    detecting whether a load instruction in a set of instructions in an issue queue has missed;
    responsive to a miss of the load instruction, allocating the load instruction to a load miss queue;
    deallocating the load instruction from the issue queue;
    determining whether there is a dependence entry for the load instruction in an issue queue portion of a dependence matrix;
    responsive to the existence of the dependence entry for the load instruction in the issue queue portion of the dependence matrix, reading data from the dependence entry of the issue queue portion of the dependence matrix that specifies a set of dependent instructions that are dependent on the load instruction; and
    writing the data into a new entry in a load miss queue portion of the dependence matrix associated with the load miss queue.

2. The method of claim 1, wherein the detecting is performed by a processor within the data processing system and wherein the allocating, deallocating, determining, reading and writing are performed by an instruction scheduler in the data processing system.

3. The method of claim 1, further comprising:
    generating, by a dependence analyzer, the dependence matrix based on the set of instructions in the issue queue, wherein the dependence matrix comprises an entry for each instruction in the set of instructions in the issue queue and an entry for each dependency an instruction has on another instruction in the set of instructions in the issue queue.

4. The method of claim 3, further comprising:
    allocating, by an instruction scheduler, additional entries to the dependence matrix based on one or more instructions in the set of instructions that are allocated to the load miss queue.

5. The method of claim 1, further comprising:
    tracking, by a mapper, the queue positions of the set of dependent instructions in the issue queue.

6. The method of claim 1, wherein the dependence matrix tracks dependences among the set of instructions in the issue queue and a set of instructions in the load miss queue.

7. The method of claim 1, where an instruction's dependence upon a second instruction in the set of instructions in the issue queue is converted to a dependence on the second instruction outside the issue queue.

8. The method of claim 1, wherein the miss of the load instruction is in a first layer (L1) cache.

9. A processor comprising:
    an instruction scheduler;
    an issue queue; and
    a load miss queue, wherein the instruction scheduler:
    in response to a miss of a load instruction in the issue queue, allocates the load instruction to the load miss queue, wherein the miss of the load instruction in a set of instructions is detected by the processor;
    deallocates the load instruction from the issue queue;
    determines whether there is a dependence entry for the load instruction in an issue queue portion of a dependence matrix;
    responsive to the existence of the dependence entry for the load instruction in the issue queue portion of the dependence matrix, reads data from the dependence entry of the issue queue portion of the dependence matrix that specifies a set of dependent instructions that are dependent on the load instruction; and
    writes the data into a new entry in a load miss queue portion of the dependence matrix associated with the load miss queue.

10. The processor of claim 9, wherein the processor further comprises a dependence analyzer and wherein the dependence analyzer:
    generates the dependence matrix based on the set of instructions in the issue queue, wherein the dependence matrix comprises an entry for each instruction in the set of instructions in the issue queue and an entry for each dependency an instruction has on another instruction in the set of instructions in the issue queue.

11. The processor of claim 10, wherein the instruction scheduler further:
    allocates additional entries to the dependence matrix based on one or more instructions in the set of instructions that are allocated to the load miss queue.

12. The processor of claim 9, wherein the processor further comprises a mapper and wherein the mapper:
    tracks the queue positions of the set of dependent instructions in the issue queue.

13. The processor of claim 9, wherein the dependence matrix tracks dependences among the set of instructions in the issue queue and a set of instructions in the load miss queue.

14. The processor of claim 9, where an instruction's dependence upon a second instruction in the set of instructions in the issue queue is converted to a dependence on the second instruction outside the issue queue.

15. An apparatus, comprising:
    a processor; and
    a memory coupled to the processor, wherein the memory comprises instructions which, when executed by the processor, cause the processor to:
    detect whether a load instruction in a set of instructions in an issue queue has missed;
    responsive to a miss of the load instruction, allocate the load instruction to a load miss queue;
    deallocate the load instruction from the issue queue;
    determine whether there is a dependence entry for the load instruction in an issue queue portion of a dependence matrix;
    responsive to the existence of the dependence entry for the load instruction in the issue queue portion of the dependence matrix, read data from the dependence entry of the issue queue portion of the dependence matrix that specifies a set of dependent instructions that are dependent on the load instruction; and
    write the data into a new entry in a load miss queue portion of the dependence matrix associated with the load miss queue.

16. The apparatus of claim 15, wherein the instructions further cause the processor to:
    generate the dependence matrix based on the set of instructions in the issue queue, wherein the dependence matrix comprises an entry for each instruction in the set of instructions in the issue queue and an entry for each dependency an instruction has on another instruction in the set of instructions in the issue queue.

17. The apparatus of claim 16, wherein the instructions further cause the processor to:
allocate additional entries to the dependence matrix based on one or more instructions in the set of instructions that are allocated to the load miss queue.

18. The apparatus of claim 15, wherein the instructions further cause the processor to:
track the queue positions of the set of dependent instructions in the issue queue.

19. The apparatus of claim 15, wherein the dependence matrix tracks dependences among the set of instructions in the issue queue and a set of instructions in the load miss queue.

20. The apparatus of claim 15, where an instruction's dependence upon a second instruction in the set of instructions in the issue queue is converted to a dependence on the second instruction outside the issue queue.

* * * * *